H. G. G. DESMAREST.
SAUCEPAN.
APPLICATION FILED MAR. 5, 1919.
1,425,371.
Patented Aug. 8, 1922.
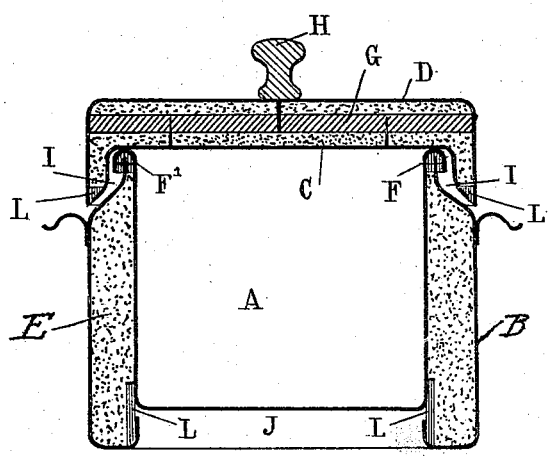
INVENTOR
HENRI G. G. DESMAREST
BY Howson and Howson
ATTORNEYS

UNITED STATES PATENT OFFICE.

HENRI GASTON GEORGES DESMAREST, OF PARIS, FRANCE.

SAUCEPAN.

1,425,371. Specification of Letters Patent. Patented Aug. 8, 1922.

Application filed March 5, 1919. Serial No. 280,847.

(GRANTED UNDER THE PROVISIONS OF THE ACT OF MARCH 3, 1921, 41 STAT. L., 1313.)

*To all whom it may concern:*

Be it known that I, HENRI GASTON GEORGES DESMAREST, a citizen of the French Republic, residing in Paris, France, Seine, have invented certain new and useful Improvements in Saucepans (for which I have filed an application in France, February 27, 1918, Pat. No. 489,064), of which the following is a specification.

The present invention relates to a kitchen utensil, in the form of a boiler or saucepan, having for its object to replace the boxes and secondary insulating casings or jackets generally known under the name of Norwegian saucepans.

The saucepan here described, the outer appearance of which does not differ from that of ordinary kitchen utensils, makes it possible to cook food direct on any furnace and then to keep it automatically in a hot enclosure.

This saucepan is constituted by two metal receptacles; an inner one forming the vessel in which the food cooks, and an outer one forming a casing and separated from the former by a layer of insulating material which is a bad conductor of heat. The inner and outer casings of stamped out metal are arranged in such a manner that no metal contact can exist between them, this in order to avoid any loss of outer heat by conductivity.

The saucepan is closed by a cover, also constituted by two parts of stamped out metal, insulated from, and not in contact with, each other.

The accompanying drawing shows the non-conducting saucepan in section:

A. Inner vessel stamped out in one piece, into which is placed the food to be cooked.

B. An outer vessel forming a casing or jacket, of stamped out metal. At the bottom portion, this casing projects inward beyond the bottom of the receptacle A to the extent of about two centimeters, so as to form an empty space J under the saucepan.

C. Lower and inner part of the cover of stamped out metal.

D. Outer casing of the cover, without contact with the inner part, so as to do away with conductivity.

E. Insulating material, such as asbestos, kieselguhr etc. or any other substance sufficiently light and resisting heat; at the points L L L L separating the inner and outer casings of the saucepan and of the cover, the insulating material must not be in the form of powder, but in the form of boards, cement, plates etc.

F F'. Pins connecting the receptacle A to the casing B.

G. A plate of wood or any other material, allowing the bottom of the cover to be screwed to its outer casing by means of the button H.

H. Button or handle of the cover.

I. Annular space which becomes filled with hot air and forms a non-conducting joint for the cover.

J. Recessed part under the saucepan, without an insulating material, owing to which the receptacle A can come into direct contact with the flames of the furnace. When the food is sufficiently cooked, the saucepan is withdrawn from the furnace, and owing to the said recess it can be placed on any desired table without any support, the immovable layer of hot air enclosed under the saucepan, forming a sufficient insulator.

In the non-conducting saucepan, the whole of the heat of the furnace, absorbed by the apparatus, is utilized; the saucepan, as soon as it is withdrawn from the fire, remains in an enclosure already heated during the original cooking of the food.

What I claim as my invention and desire to secure by Letters Patent is:—

1. A cooking utensil comprising a vessel adapted to receive the food to be cooked, and a heat-insulating casing therefor extending below the exposed bottom of said vessel, but forming therewith an air chamber which serves to minimize heat radiation from the exposed bottom of said vessel when resting upon a table or the like.

2. A cooking utensil comprising a metallic vessel adapted to receive the food to be cooked, a metal casing surrounding said vessel but leaving the bottom thereof exposed, and insulating material spacing the bottom of said vessel from the casing.

3. In a construction such as specified in claim 2, a casing extending below the exposed bottom of the vessel, but forming with the latter an air chamber which serves to minimize heat radiation from the exposed bottom when the utensil rests upon a table or the like.

4. A cooking utensil comprising a vessel adapted to receive food to be cooked, a metal casing therefor which extends below the exposed bottom of the vessel and serves to form therewith a closed chamber which minimizes heat radiation from the bottom of the vessel when the utensil is resting upon a table or the like, and insulating material spacing the vessel from the casing at all points to prevent heat conduction between the metal parts of the casing and vessel.

5. A cooking utensil comprising an outer metallic casing, an inner metallic vessel adapted to receive the food to be cooked, said vessel having an out-turned flange which overlies the upper edge of the casing, and upon which said vessel is supported, in combination with insulating material interposed between said flange and casing to prevent heat conduction and radiation loss.

6. A cooking utensil having a metallic casing, a metallic cooking vessel separated from the upper portion of the casing, said casing extending below the bottom of the vessel, together with insulation in sheet form between the lower portion of the vessel and the bottom of the casing.

7. A cooking utensil comprising a double walled vessel, heat-insulating material separating the walls thereof, the bottom of the inner vessel being exposed to direct heating, and the outer wall extending below said bottom to afford therewith an air chamber when the utensil is placed upon a table or the like.

In testimony whereof I have signed my name to the specification.

HENRI GASTON GEORGES DESMAREST.

Witnesses:
CHARLES DONY,
M. DEFÉRIMONT.